United States Patent [19]

Yeum

[11] Patent Number: 4,696,516

[45] Date of Patent: Sep. 29, 1987

[54] CONTOURED AIRCRAFT AND CAR SEAT

[75] Inventor: Hee-Sung Yeum, Seoul, Rep. of Korea

[73] Assignee: DAE-AH Human Engineering Inc., Rep. of Korea

[21] Appl. No.: 915,942

[22] Filed: Oct. 3, 1986

Related U.S. Application Data

[63] Continuation of Ser. No. 793,590, Oct. 31, 1985.

[51] Int. Cl.$^4$ .............................................. A47C 7/02
[52] U.S. Cl. .................................. 297/458; 297/452; 297/460; 297/DIG. 1
[58] Field of Search ............... 297/452, 445, 458, 459, 297/460, DIG. 2, DIG. 4, DIG. 1; 5/431, 448

[56] References Cited

U.S. PATENT DOCUMENTS

| | | | |
|---|---|---|---|
| 4,206,945 | 1/1980 | Kifferstein | 297/DIG. 6 |
| 4,418,958 | 12/1983 | Watkin | 297/458 |

FOREIGN PATENT DOCUMENTS

| | | | |
|---|---|---|---|
| 627157 | 2/1963 | Belgium | 297/458 |
| 2039121 | 2/1972 | Fed. Rep. of Germany | 297/458 |
| 3334864 | 4/1985 | Fed. Rep. of Germany | 297/458 |

*Primary Examiner*—James T. McCall
*Attorney, Agent, or Firm*—Brumbaugh, Graves, Donohue & Raymond

[57] ABSTRACT

A contoured seat for airplanes and automobiles comprising a bottom portion and a back portion, both supported by a basic frame support. The bottom portion comprises a bottom cushion and a bottom support. The cushion has a front edge, two thigh portions, a center ridge, a fundament section, two side portions, and a rear fundament section, all conforming to the passenger's shape. Preferably, the cushion also contains a plurality of identations. The thigh portions and the fundament section are depressed below the surrounding surfaces. The back portion, which surrounds the frame support, has two lower side portions, a lower central plane portion, a lower middle central portion, and an upper middle central portion. The side portions extend to support the hip. The lower central plane portion extends to support the user's extreme lower back as does the upper lower central plane portion. The lower middle central plane portion is concave and the upper middle central section is convex to provide a form fitting support for the user's vertebral column. The support itself is contoured and preferable contains a plurality of holes. Between the support and the back portion in the area of the upper lower central plane portion is preferably placed memory material to provide further support and comfort.

15 Claims, 26 Drawing Figures

CONTOURED AIRCRAFT AND CAR SEAT

This application is a continuation of application Ser. No. 793,590, filed on Oct. 31, 1985.

FIELD OF INVENTION

The present invention relates to aircraft and car seats, and the like and, more specifically, to a contoured aircraft and car seat consisting of a seat portion, a back seat, and a neck and head rest.

BACKGROUND OF INVENTION

Aircraft and car seats are generally constructed without consideration to the human body's skeletal formation. In fact, most seats are designed without regard to the spinal shape, weight and mechanical distribution between antagonistic muscle groups and ligaments. Such constructions create abnormal strains on a person's body. Further, most seats are either too hard, flat, or horizontal, causing at the minimum discomfort, or are too soft, causing pain resulting from extreme hip and pelvis rotation. Most seats fail to properly support the person and most importantly the person's lumbar lordosis, thoracic and cervical vertebrae. The conventional aircraft and car seat may cause vertebral subluxation in the lumbar, thoracic and cervical spine with use after long periods of time.

SUMMARY OF THE INVENTION

Accordingly, it is a primary object of the present invention to provide a contoured aircraft and automobile seat, which is not subject to the foregoing deficiencies.

Other objects are to provide such a contoured seat that is durable and comfortable.

These objects are attained, in accordance with the present invention, by providing a contoured aircraft and car seat which includes a basic frame support attached to which is a bottom portion, which acts as a base for the entire spine by supporting the pelvis and sacrum, a back portion, which is contoured to the person's lumbar and thoracic vertebrae, and a neck rest, which is designed to support the cervical vertebrae and the head to prevent lateral flexion.

The bottom portion comprises a bottom cushion and a bottom support, both supported by the basic frame support. The cushion, having a plurality of indentations towards its rear side, has a front edge, two thigh portions, a center ridge, a fundament section, side portions and a rear fundament section, all contoured to provide equal weight distribution and comfort. Below the cushion is the bottom support, which preferably is of harder material and is hardest in the region below the fundament section for extra support.

The back portion is supported by a plastic frame and the frame support or preferably an aluminum sheet, which itself is contoured. Between the aluminum sheet and the lower central plane portions is memory material, which conforms to the shape of the particular person using the seat. The lower central plane of the back portion curves outwards to meet and support the extreme lower area of the person's back. The upper lower central plane portion is convex in the lordotic direction and the lower middle central portion is concave in the kyphotic direction. The upper middle portion protrudes outwards to provide support along the upper vertebrae column.

Further, the neck rest preferably consists of a contoured neck pillow attached to the back portion of the seat by velcro tape. The head portion, disposed just above the neck rest, is contoured to the natural shape of the head.

BRIEF DESCRIPTION OF THE DRAWINGS

The foregoing and other objects, features, and advantages will become apparent and a better understanding will result from the following detailed description of the invention, from the claims and from the drawings, of which

DETAILED DESCRIPTION OF THE PREFERRED EMBODIMENT

Figures 1, 2:
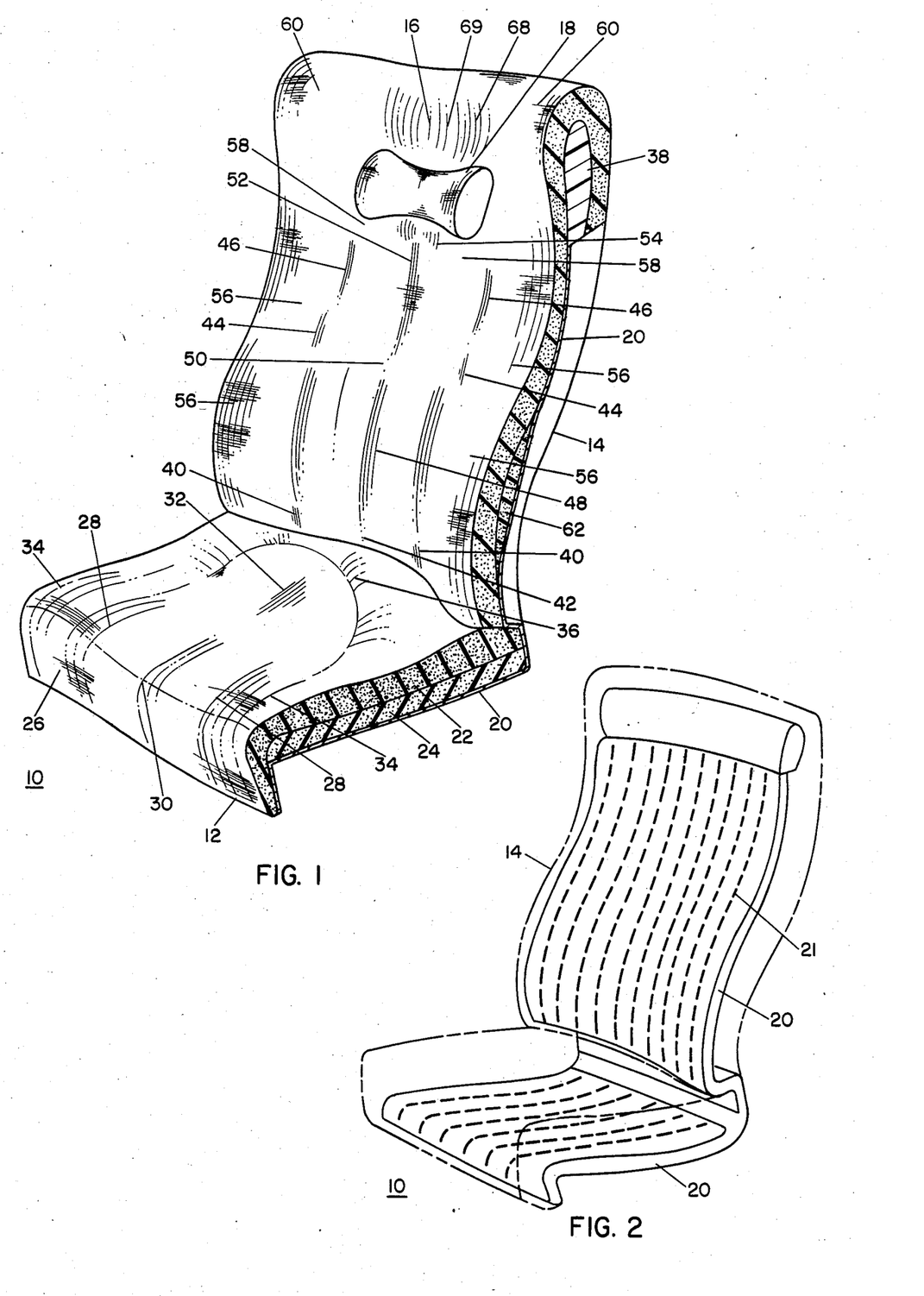
FIG. 1 is a partial front perspective view of the contoured seat constructed in accordance with the present invention as adapted for an aircraft.
FIG. 2 is a partial front perspective view of the contoured aluminum sheet and plastic frame of the contoured seat of FIG. 1.

Referring particularly to FIGS. 1 and 2, there is shown in accordance with the present invention a contoured seat 10 having a bottom portion 12, a back portion 14 and a head 16 and neck rest 18, supported by a basic frame support 20.

Figure 3:
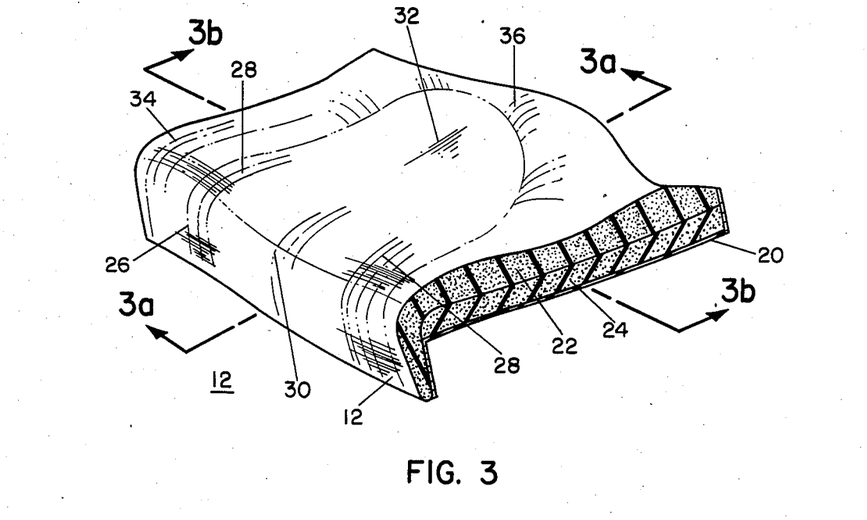
FIG. 3 is a partial front perspective view of the bottom portion of the contoured seat constructed in accordance with the present invention as adapted for an aircraft.
Figure 3A:
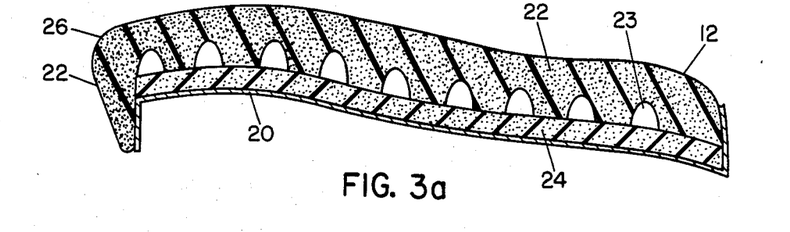
FIG. 3a is a cross-sectional view of the bottom portion of the contoured seat taken along lines 3a—3a of FIG. 3.
Figure 3B:
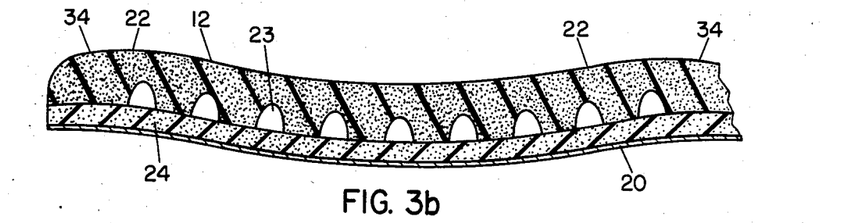
FIG. 3b is a cross-sectional view of the bottom portion of the contoured seat taken along lines 3b—3b of FIG. 3.

The bottom portion 12, shown in FIGS. 1 and 3, comprises a bottom cushion 22 and bottom support 24, both supported by basic frame support 20. (see FIG. 2). The cushion 22, preferably of urethane foam, has a front edge 26, two thigh portions 28, a center ridge 30, a fundament section 32, side portions 34, and a rear fundament section 36, which surrounds the supporting surface for the ischium. As illustrated most accurately in FIGS. 3a and 3b, the cushion 22 preferably has a plurality of approximately 2 cm diameter, 2.5 cm depth inverted U-shaped indentations 23 about 5 cm apart. Indentations 23 make for a more comfortable, lighter weight cushion. The bottom cushion 22 provides a foundation for the spine and is designed to support the pelvis and the posterior of the thigh. It is supported by bottom support 24, which in turn is supported by basic frame support 20. The bottom support 24 is preferably of urethane foam or of a similar hard flat cushion that preferably has its hardest portion in the ischial tuberosities area under the fundament section 32. Such added support prevents pelvic rotation.

The front edge 26 of bottom cushion 22 is rounded off to reduce the leg pains which normally occur from the sharp edges generally found in aircraft and car seats. The thigh portions 28, and the fundament section 32 are contoured in that they are depressed in the surface of the seat. The thigh portions 28, which are separated by the center ridge 30 and adjoin the fundament section 32, are elongated and like the fundament section 32, are concave or depressed below the surrounding surfaces 34, 36, 30. Such depressions cause the person's fundament and thighs to relax on the seat in a natural neutral position. These thigh indentations distribute the gravitational force equally over the surface of the leg thereby promoting proper blood circulation into the lower extremities. The side portions 34 and the rear fundament section 36 provide for a more comfortable and weight balanced fit. In this manner, no undue pressure is exerted on either the muscles of the fundament, the flexor muscles of the thigh, or the nerves and vessels in the surrounding areas. This contour design eliminates excessive local pressures that may cause subluxation.

Further towards the goal of equal weight and force distribution the bottom portion 12 is preferably positioned in such a way that the force which comes from the knee through the foot reduces the force which comes from the head. To achieve this, the front of the bottom portion 12 is preferably elevated 10 degrees (see FIG. 9a). This also prevents the hip sliding effect that causes abnormal lumbar posture. Moreover, upon lowering back portion 14 the bottom portion 12 is proportionally raised so that the passenger's body will not shift, assuring spinal security upon the seat 10. For example, should the front seat bottom portion 12 be tilted upwards approximately ten degrees, when the passenger tilts the back portion 14 back from 100 degrees to 120 degrees, the bottom portion 12 tilts upwards approximately five additional degrees. This prevents the rotation of the ilium on the sarco-iliac articulation, the flattening of the lumbar lordosis, and the effects of abnormal positioning over other regions of the spine. This feature also helps maintain proper hip position, helps reduce forward sliding, and elevates the knee above the hip to counteract the forward and downward force of the upper torso.

In sum, the sides 34 are of the greatest width, the center ridge 30 is of the next greatest width, and the thigh portions 28 are of the smallest width. Such a contoured bottom works to free areas of bodily contact from projections which may cause injury and to achieve the desired attributes of muscular and skeletal balance that is the subject of the invention.

Figure 4:
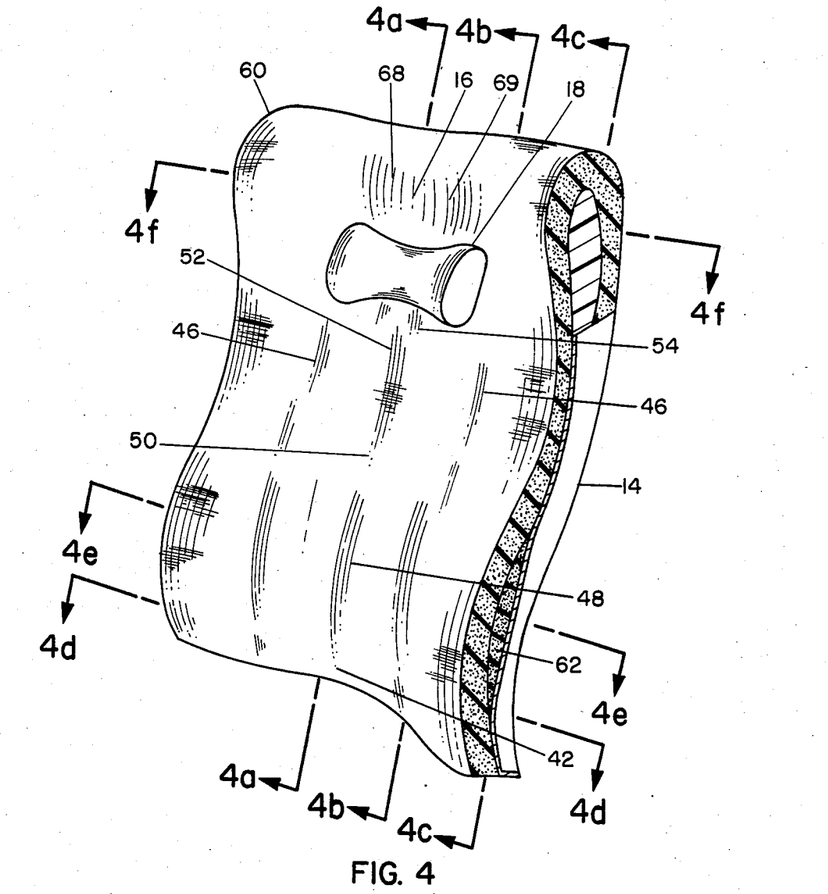
FIG. 4 is also a partial front perspective view of the back portion of the contoured seat constructed in accordance with the present invention as adapted for an aircraft.

The back portion 14, shown in FIGS. 1 and 4, which is attached to welded aluminum tubing that comprises an aluminum sheet 20 or the like, and a plastic frame 38, has extending lower side portions 40, a first or lower central plane portion 42, slight troughs 44, scapula portions 46, a second or upper lower central plane portion 48, a third or lower middle central plane portion 50 and a fourth or upper middle central section 52. The back portion 14, preferably of urethane foam, provides support for the lumbar lordosis, the thoracic kyphorsis and the cervical lordosis. While what is being described as contoured is the front of the back portion 14, it is to be noted that the portion 14 surrounds sheet 20 and plastic frame 38 to form a rear of the back 14.

The extending lower side portions 40 are contoured to support the sacral base and the muscles extending along the vertebral columns, and to protect the kidney area. The laterally projecting marginal portions assist in maintaining the vertebral columns in its natural upright position. Further, troughs 44 prevent the exertion of pressure on the muscles extending along the vertebral column. Both sides of the thoracic portion 46 are recessed to adapt to the natural shape of the scapula. Protruding areas 54 provide further support for the thorax and central positioning of the spine. The laterally projecting marginal portions 56 promotes better respiration, digestion, blood circulation, and diaphram freedom. Further, upper shoulder portions 58 and 60 provide for additional support.

Figure 4A:
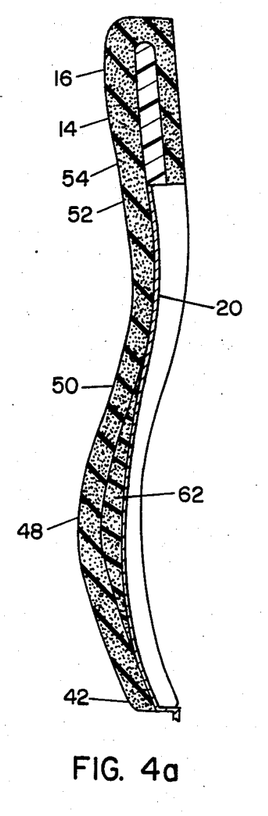
FIG. 4a is a cross-sectional view of the back portion of the contoured seat taken along lines 4a—4a of FIG. 4.
Figure 4B:
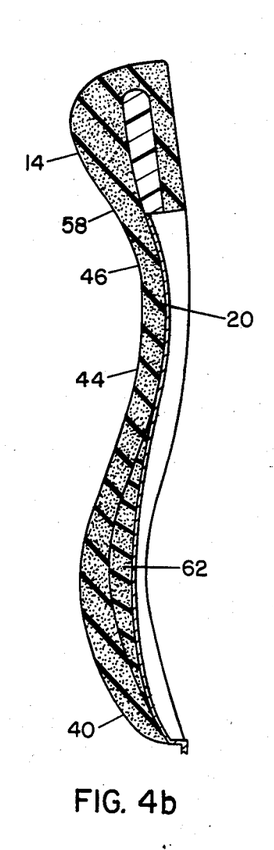
FIG. 4b is also a cross-sectional view of the back portion of the contoured seat taken along lines 4b—4b of FIG. 4.
Figure 4C:
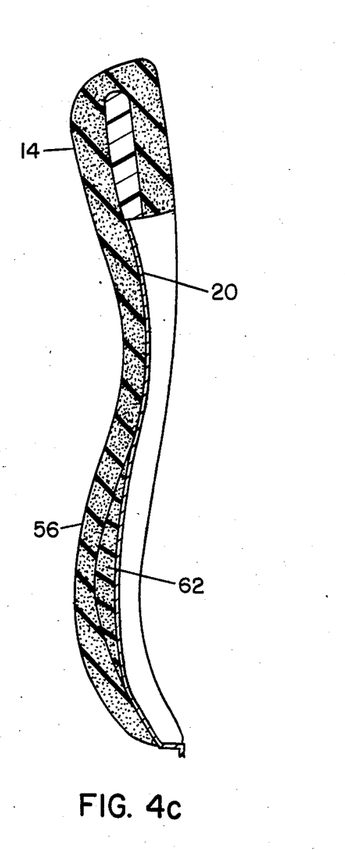
FIG. 4c is also a cross-sectional view of the back portion of the contoured seat taken along lines 4c—4c of FIG. 4.

The central planes of the back portion 14 protrudes in relation to the remaining surfaces of the back portion 14 and is adapted to the shape of the vertebral column. These projecting portions of the back portion 14 ensure the optimal position of the vertebral column. Particular reference to FIGS. 4a, 4b and 4c illustrate the intentional varied support throughout the back portion 14.

Figure 4D:
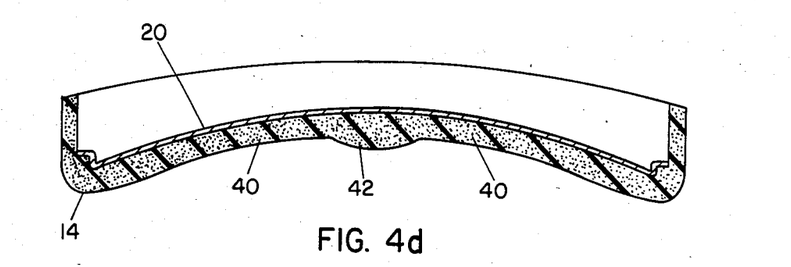
FIG. 4d is a cross-sectional view of the back portion of the contoured seat taken along lines 4d—4d of FIG. 4.
Figure 4E:
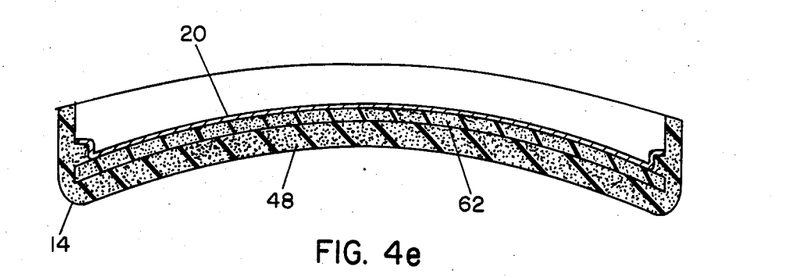
FIG. 4e is a cross-sectional view of the back portion of the contoured seat taken along lines 4e—4e of FIG. 4.

The lower central plane portion 42 is designed to extend slightly outwards compared to both sides of the sacral bases and to slightly touch the sacrum. Reference to FIG. 4d shows how the lower center portion 42 slightly protrudes from the extending side portions 40, and, continuing upwards, as shown in FIG. 4e the upper lower central plane portion 48 is convex in the lordotic direction. Following the central lines, the lower middle central plane portion 50 becomes concave in the kyphotic direction and the upper middle portion 52 protrudes slightly outwards to provide support along the upper vertebral column. The projections correspond to a person's natural spine curvature and promote better respiration, digestion and blood circulation. Further, the rear fundament section 36 of the bottom portion 22 together with the lower portion of the back portion 14 and side portions 40 act as a base for the pelvis and sacrum, which in turn acts as the support for the lumbar, thoracic, and cervical vertebrae.

The basic frame support 20, as illustrated in FIG. 2 preferably consists of an aluminum sheet 20 placed approximately 3 cm below the inner surface of the back portion 14. The aluminum sheet 20 preferably contains a plurality of apertures 21 of 0.5 cm radius disbursed throughout the sheet 20. It is contoured in the same shape as the back portion 14 except that in the lumbar vertebrae area 48 the sheet 20 is preferably less curved than the back 14. To provide further support and comfort, between the sheet 20 and the back 14 is placed, as illustrated in FIGS. 1 and 4 memory material (viscosity elastic urethane foam) 62, which conforms to the shape of the particular person using the passenger seat 10.

Figure 5:
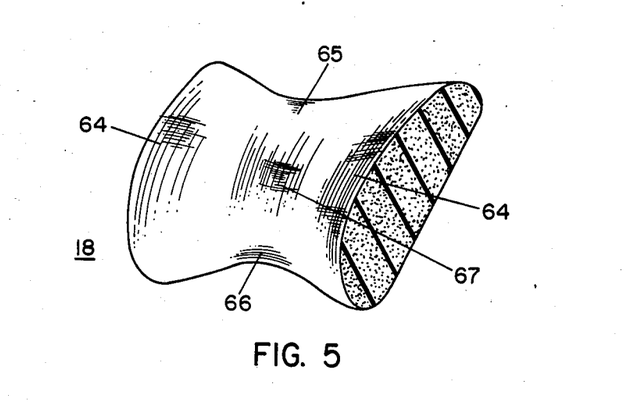
FIG. 5 is a partial front perspective view of the neck rest constructed in accordance with the present invention as adapted for use in an aircraft.

Preferably, the seat 10 is constructed with a detachable and adjustable neck rest 18 (see FIG. 5), which consists of a contour pillow preferably having velcro tape or the like attached to the rear of the rest 18 for adjustability of the rest 18. To promote even weight distribution, to relieve tension, to enhance comfort and to prevent lateral movement of the cervical spine the side portions 64 and top 65 and bottom 66 portions are contoured in the shape of the cervical vertebrae. The contoured rest 18 enhances the natural pumping action of cerebral spinal fluid. The side portions 64 extend outwards in relation to the top 65, middle 67 and bottom 66 portions. The neck rest 18 promotes the even distribution of head weight and prevents strain to the supportive neck muscles and neurological components of the brain stem and spinal cord.

Figure 4F:
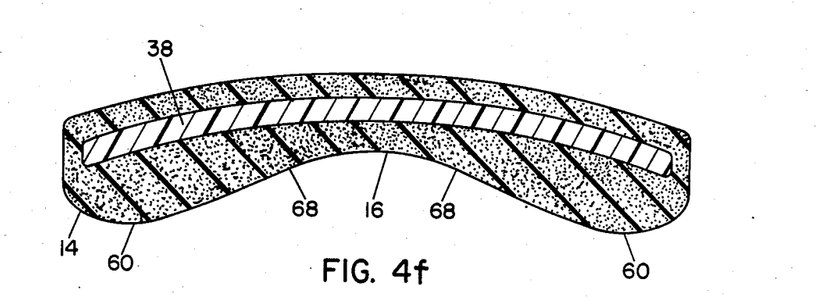
FIG. 4f is a cross-sectional view of the back portion of the contoured seat taken along lines 4f—4f of FIG. 4.

Moreover, the seat 10 is preferably constructed to comprise a head section 16, which, as shown in FIGS. 1, 4, and 4f, is disposed just above the neck rest 18 and is grooved and depressed to adapt to the structure and the natural position of a person's head. Both sides 68 of the head section 16 protrude and then flatten out to area 69. The head section 16 is padded with frangible urethane foam on the plastic frame 38 to protect against head injury. The section 16 promotes even distribution of the head to keep the user comfortable, to promote good blood circulation and to relax the supportive muscles and neurological components of the brain stem and spinal cord.

It is suggested that the upholster of seat 10 should not contain horizontal stitching or seams, which tends to create uneven pressure on a person. Instead a vertical stitch is preferable so long as it avoids the central vertebrae column or central areas 42, 48, 50 and 52.

Figures 6, 7:
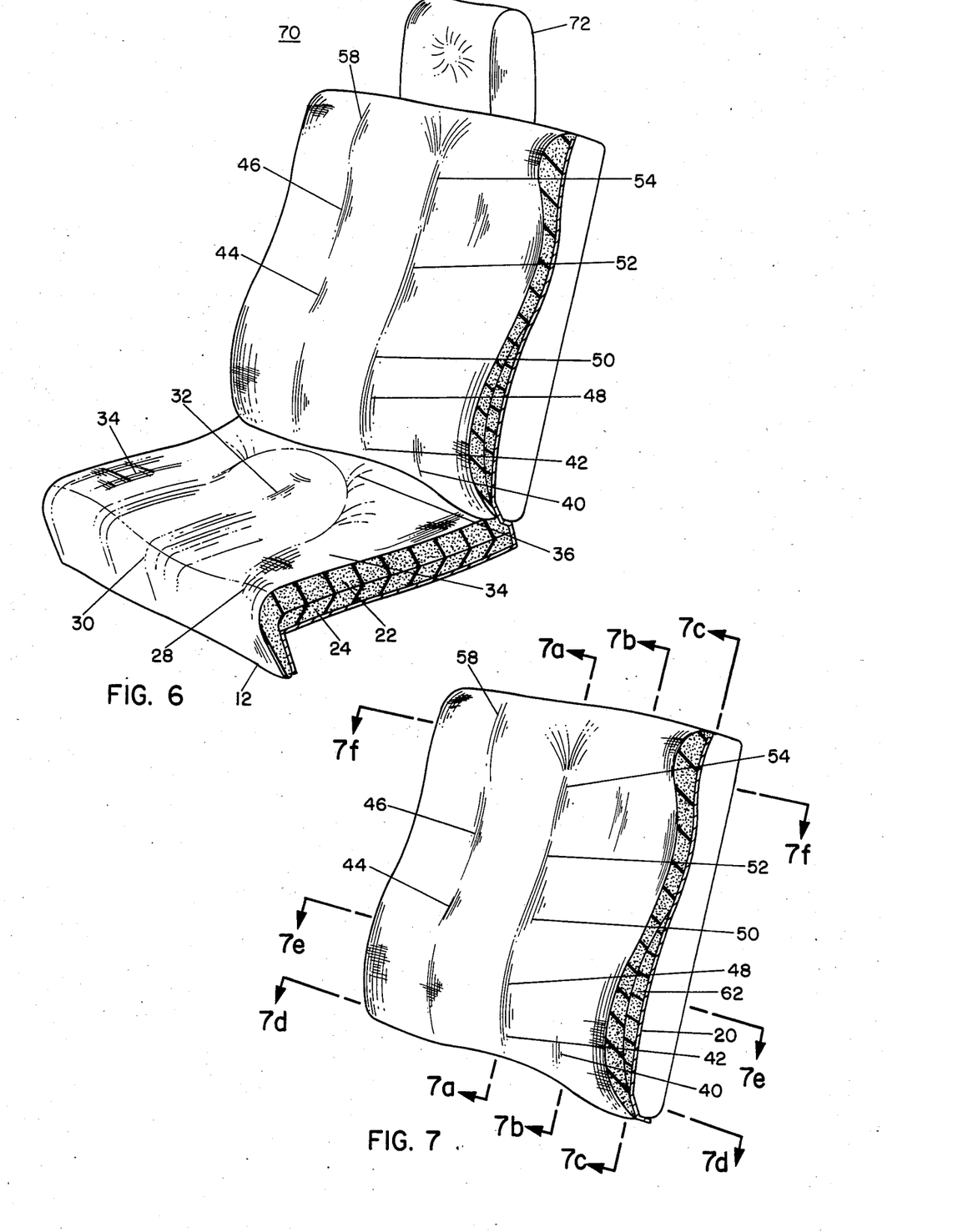
FIG. 6 is a partial front perspective view of the contoured seat constructed in accordance with the present invention as adapted for an automobile.
FIG. 7 is a partial front perspective view of the back portion of the contoured seat seat of FIG. 6.
Figure 7A:
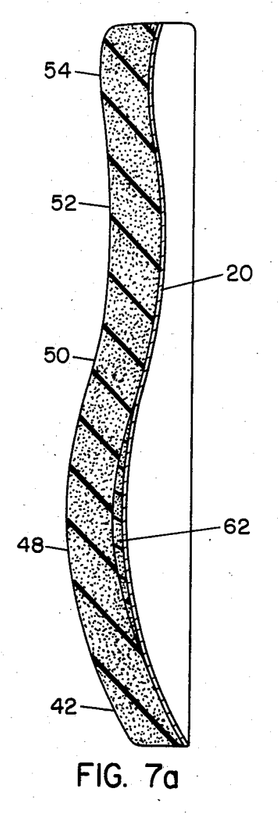
FIG. 7a is a cross-sectional view of the back portion of the contoured seat taken along lines 7a—7a of FIG. 7.
Figure 7B:
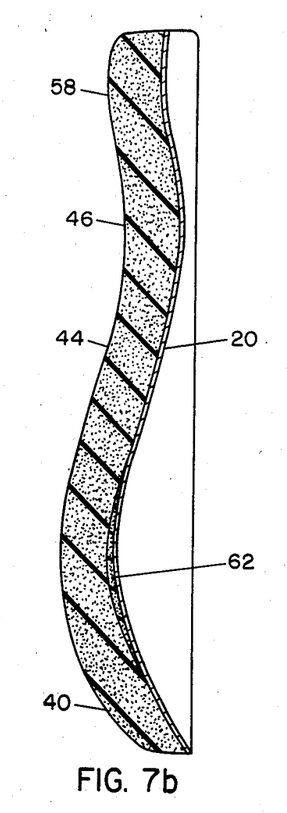
FIG. 7b is also a cross-sectional view of the back portion of the contoured seat taken along lines 7b—7b of FIG. 7.
Figure 7C:
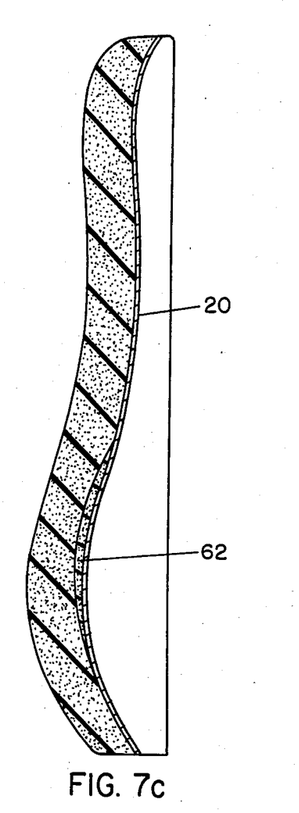
FIG. 7c is also a cross-sectional view of the back portion of the contoured seat taken along lines 7c—7c of FIG. 7.
Figure 7D:
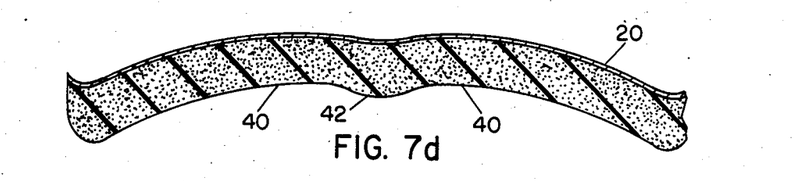
FIG. 7d is a cross-sectional view of the back portion of the contoured seat taken along lines 7d—7d of FIG. 7.
Figure 7E:
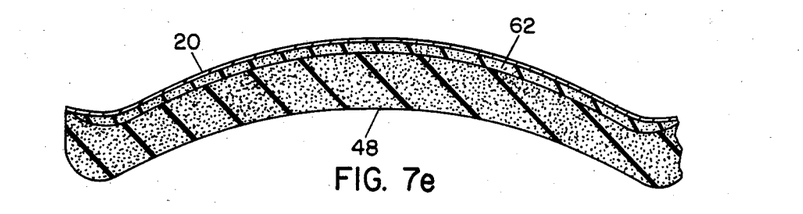
FIG. 7e is also a cross-sectional view of the back portion of the contoured seat taken along lines 7e—7e of FIG. 7.
Figure 7F:
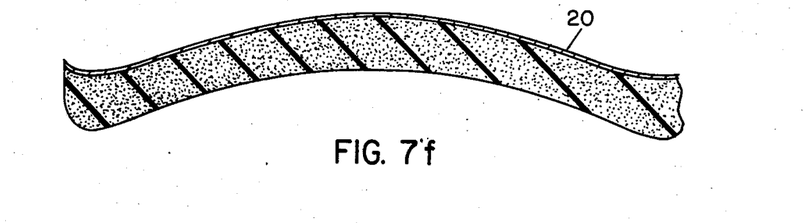
FIG. 7f is also a cross-sectional view of the back portion of the contoured seat taken along lines 7f—7f of FIG. 7.

In accordance with the present invention, and referring particularly to FIG. 6 there is shown an automobile contoured seat 70 having the same features as aircraft seat 10, as shown in FIGS. 1 and 2, except for certain differences, which will now be explained. In contrast to the use of an adjustable neck rest 18, the automobile seat 70 preferably comprises an adjustable head and neck rest 72 instead of neck rest 18, and preferably uses more cushion to provide additional lumbar and thoracic side support to prevent side sliding while driving. The variation of width of the back portion is illustrated in FIGS. 7a–7c and FIGS. 7d–7f.

Figure 8:
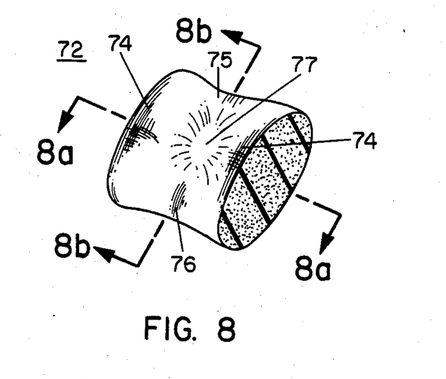
FIG. 8 is a partial front perspective view of the head rest constructed in accordance with the present invention as adapted for an automobile.
Figures 8A, 8B:
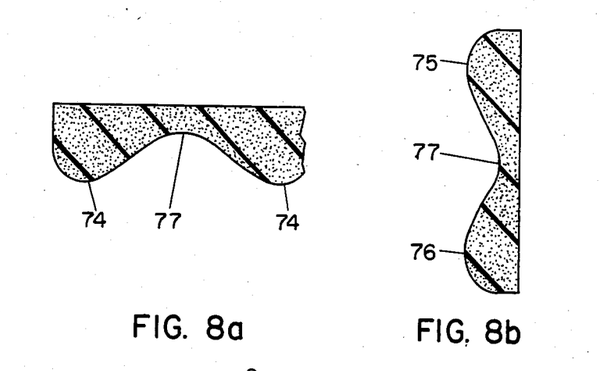
FIG. 8a is a cross-sectional view of the head rest taken along lines 8a—8a of FIG. 8.
FIG. 8b is a cross-sectional view of the head rest taken along lines 8b—8b of FIG. 8.

The head and neck rest 72, as illustrated in FIGS. 8, 8a, and 8b is designed to conform to the natural shape of the head. To promote even weight distribution, to relieve tension, to enhance comfort and the natural pumping action of vertebrae spinal fluid, side portions 74 extend outwards in relation to the top 75 and neck 76 portions, and the neck portion 76, side portions 74 and top portion 75, which surround indentation 77, are contoured in the shape of the cervical vertebrae and head.

Figure 9A:
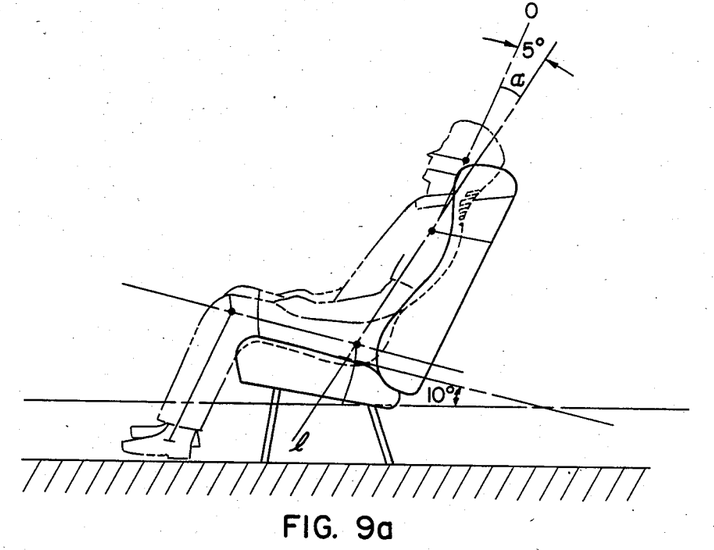
FIG. 9a is a cross-sectional view of the contoured seat adapted for an aircraft, showing a person sitting in said seat.
Figure 9B:
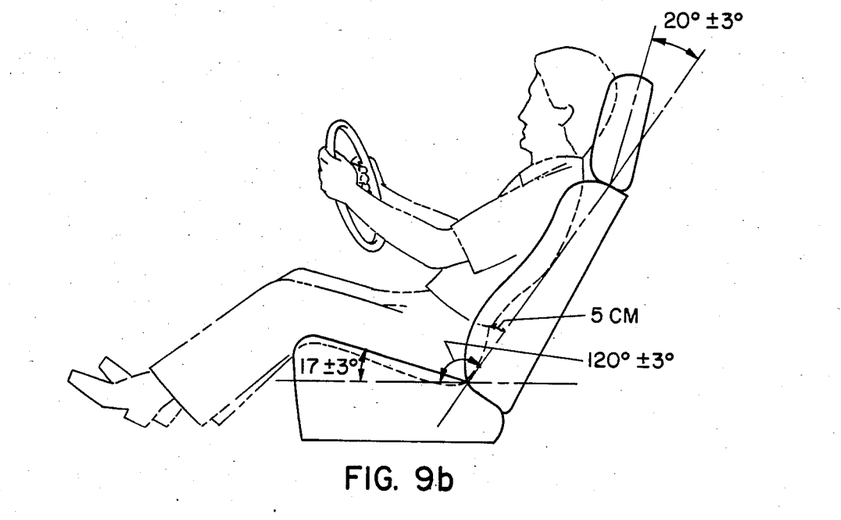
FIG. 9b is a cross-sectional view of the contoured seat adapted for an automobile, showing a person sitting in said seat.

Reference to FIGS. 9a and 9b shows that this invention is carefully designed to adapt to the natural contours of the human body. Normally, and as implemented for the car seat, a back seat incline degree of $120°\pm3°$, a bottom seat incline degree of $17°\pm3°$ and a 5 cm lumbar support provides the least disk pressure and the best combination for a comfortable seat. Nevertheless, in the case of an aircraft passenger and in consideration of landing and take-off safety requirements the bottom seat incline varies from 10 to 15 degrees and the back seat reclines from 100 to 120 degrees. Further, when the passenger sits, the degrees between the hip joint, shoulder point plane, and the shoulder point, ear point plane is approximately five degrees. This five degree difference allows the average person to maintain the normal S-curve of the spine in all reclining positions. Hence, the best postural position in any degree of reclination is provided.

Although the invention has been described and illustrated herein by references to a specific embodiment thereof, it will be understood that such embodiment is susceptible to variation and modification without departing from the inventive concepts disclosed. All such variations and modifications, therefore, are intended to be included within the spirit and scope of the appended claims.

I claim:

1. A contoured seat, comprising:
a bottom portion having a bottom cushion disposed on top of a bottom support and attached to a basic frame, said bottom cushion comprising urethane foam having a plurality of indentations and having a curved front edge, rear edge and side edges, a downwardly sloping center ridge extending perpendicular to said front edge and extending from, at its highest point, the center of said front edge to, at its lowest point, halfway across said bottom portion, an indented fundament section of semielliptical shape having an open end, which section receives said lowest point of said center ridge generally at the center of its open end, and a rear portion formed between said rear edge and said fundament section, and thigh portions which are surrounded by side portions that adjoin said side edges and are separated by said center ridge, which thigh portions are indented and extend from said front edge into said fundament section below said surrounding rear and side portions to provide a receiving area in which a person comfortably sits;

a back portion, supported by said basic frame and a plastic frame attached thereto, said back portion having a lower edge, top edge and side edges, said lower edge being adjustably attached to said rear edge of said bottom portion, said back portion being divided by a central plane extending from the center of said lower edge to the center of said top edge, where said central plane has a first central plane portion adjoining said bottom portion and extending slightly outwardly to support the person's extreme lower back area, a second central plane portion extending outwardly in the lordotic direction, a third central plane portion extending inwardly in the kyphotic direction, and a fourth central plane portion extending outwardly to meet the upper back in the area between the shoulder blades, said back portion further having two lower side portions symmetrically disposed about said first central plane portion to support the body's hip area, two through portions symmetrically disposed about said second and third central plane portions, and two thoracic portions symmetrically disposed about said fourth central plane portion to support the shoulder blades, wherein between said back portion and said basic frame is disposed a memory material support, which extends between said side edges of said back portion and from said first central plane portion to said third central portion, so as to conform to the lower back of said person using said seat.

2. The contoured seat of claim 1 further comprising a neck rest adjustably attached to said back portion.

3. The contoured seat of claim 2 wherein said back portion further comprises a head section disposed above said neck rest, said head section being indented to conform to the structure and natural position of a person's head.

4. The contoured seat of claim 1 further comprising:
a head and neck rest, having an upper edge, a lower edge, and side edges, said rest being removably and adjustably attached to an area above said fourth central portion of said back portion, and said rest having a centrally located indentation surrounded by side portions and upper and lower portions which respectively adjoin said edges, where said side, upper and lower portions extend outwardly and gradually slope downwards towards said indentation, and said upper and lower edges bend slightly inwards towards said indentation at approximately the center of said edges.

5. The contoured seat of claim 4 wherein said head and neck rest is removably and adjustably attached to said back portion by hook and loop fasteners.

6. The contoured seat of claim 1 wherein said indentations are inverted-U shaped, approximately 2 cm in diameter, 2.5 cm in depth and 5 cm apart.

7. The contoured seat of claim 1 wherein said bottom support comprises urethane foam, having a hard portion located below said fundament section.

8. The contoured seat of claim 1 wherein said back portion comprises urethane foam.

9. The contoured seat of claim 8 wherein said basic frame comprises aluminum sheet material.

10. The contoured seat of claim 9 wherein said aluminum sheet is disposed approximately 3 cm below said back portion.

11. The contoured seat of claim 10 wherein said aluminum sheet contains a plurality of holes.

12. The contoured seat of claim 11 wherein said plurality of holes are of 0.5 cm radius.

13. The contoured seat of claim 12 wherein said aluminum sheet is contoured in the shape of said back portion.

14. The contoured seat of claim 12 further comprising memory material disposed between said back portion and said aluminum sheet in the area of said second central plane portion.

15. The contoured seat of claim 14 wherein said aluminum sheet is contoured in the shape of said back portion in the area above said second central plane portion.

* * * * *